July 8, 1952 — W. WRIGLEY — 2,602,239

TRUE RATE OF TURN INSTRUMENTS

Filed Sept. 17, 1946 — 3 Sheets-Sheet 1

INVENTOR
WALTER WRIGLEY
BY Herbert H. Thompson
his ATTORNEY.

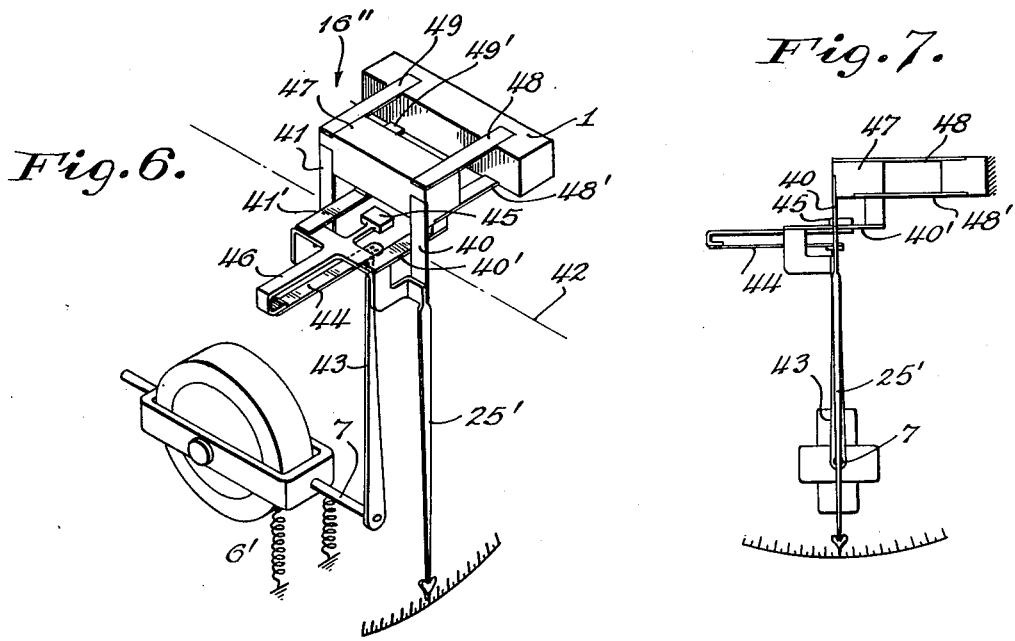
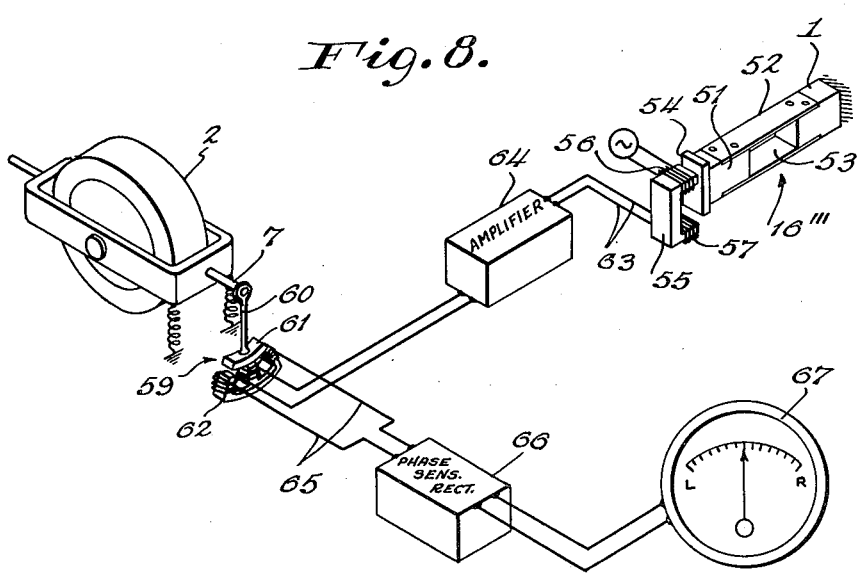

July 8, 1952 W. WRIGLEY 2,602,239
TRUE RATE OF TURN INSTRUMENTS
Filed Sept. 17, 1946 3 Sheets-Sheet 3

INVENTOR
WALTER WRIGLEY
BY
ATTORNEY.

Patented July 8, 1952

2,602,239

UNITED STATES PATENT OFFICE 2,602,239

TRUE RATE OF TURN INSTRUMENTS

Walter Wrigley, Wollaston, Mass., assignor to The Sperry Corporation, a corporation of Delaware Application September 17, 1946, Serial No. 697,457

9 Claims. (Cl. 33—204)

This invention relates to two degree of freedom gyroscopes generally employed to measure the rate of turn of the vehicles on which they are mounted. Such gyroscopes have only one pivotal axis besides the axis of spin and are restrained to give an output which is a measure of the rate of turn of the craft about the vertical axis of the craft.

The rate of turn instruments as heretofore employed give an output which is actually a measure of the rate of yaw about an axis perpendicular to the average plane of the wings of the craft on which it is mounted and not of the true rate of turn of the craft in azimuth. In other words, when the craft is level, the rate of turn gyro will give an output which is a true measure of the rate of turn but when the plane banks in making a turn, an error due to the bank angle enters the output of the rate gyro and causes a false output or indication. In the extreme case of a 90° bank angle the gyro ceases to operate as a turn indicator and no indication is secured because the gyro spin axis would be in a vertical position. However, the instrument would be accurate up to steep bank angles such as 60 or 70 degrees, if the output or indication is corrected as hereinafter explained.

If we let R be the rate of turn of the craft about a vertical axis relative to the earth and let $\theta$ be the bank angle of the craft as it turns about this vertical axis, then the amount of precession of the gyro under the usual resilient restraint will be proportional to the product R cos $\theta$. Therefore the indicated rate of turn will be diminished by a cosine function of the bank angle. By my invention I eliminate this error by obtaining a signal which is equal to the reciprocal of the cosine function, i. e., a secant function of the bank angle and modify the gyro output by this secant function.

According to my invention I therefore provide a means for effectively correcting the cosine of the bank angle error in the output of the rate gyro and thereby give an output which is a measure of rate of turn about true vertical i. e., an axis coincident with the direction in which gravity acts.

Another feature of the invention is to provide a rate of turn gyro instrument, the output of which is modified by an amount proportional to a trigonometric function of the bank angle i. e., the output of the rate of turn gyro is multiplied by the reciprocal of the cosine of the bank angle or by its equivalent, the secant of the bank angle.

The primary object of my invention is to provide a rate of turn instrument in which errors therein caused by bank of the craft on which the instrument is mounted during turns are eliminated.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other features and advantages will become apparent from the specification, taken in connection with the accompanying drawings wherein:

Fig. 6 is a diagrammatic perspective view showing another modification of the invention;

Fig. 7 is a front elevational view of the apparatus shown in Fig. 6;

Fig. 8 is a diagrammatic perspective view showing an electrical modification of the invention;

The rate of turn gyroscope shown in this invention is of the type shown in Reissue Patent No. 22,330 dated June 8, 1943 to C. S. Draper. It is of the liquid damped, spring suspended type wherein leaf springs are used not only to suspend the trunnions of the rotor bearing frame but also to limit the precessional rotation of said frame to very small angles, the rotation being proportional to the rate of turn of the craft on which it is mounted, but diminished by a cosine function of the bank angle.

Figure 1:
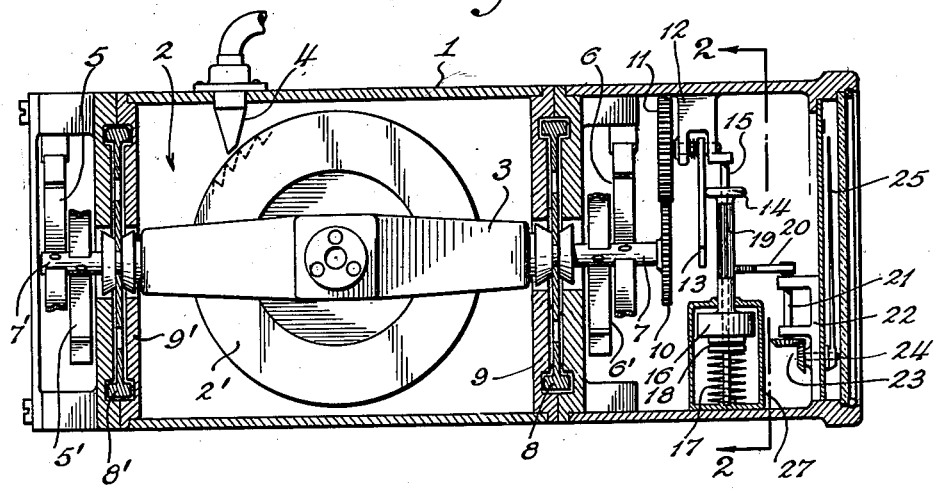
Fig. 1 is a sectional view of a rate of turn gyroscope constructed according to one form of the invention.

Referring now to Fig. 1, the gyroscopic element 2 of the rate of turn gyroscope is shown as enclosed within a housing 1. The gyro rotor 2' is journaled in a normally horizontal spin axis of the rotor bearing frame 3 which frame in turn is journaled on a horizontal axis normal to said spin axis. The rotor 2' is shown as being air driven as by nozzle 4 which is connected to some source of pressure (not shown). The rotor bearing frame 3 is journaled on the fore and aft horizontal axis of the craft by means of leaf springs 5, 5' at the one end of the casing, and by leaf springs 6, 6' at the other end thereof, one end of the springs being fastened at the periphery of the casing and the other ends being secured to the rotor bearing frame trunnion shafts 7, 7'. The precessional rotation of the shafts 7, 7' is restrained by leaf springs 5, 5', 6, 6' and this limited rotation is proportional to the rate of turn of the craft but diminished by a cosine function of the bank angle. The gyroscope 2 is liquid damped as by means of damping discs 8, 8' fastened to the rotor bearing frame 3 and located in liquid containing end walls 9, 9' of the instrument housing 1.

For a more detailed description of the gyroscopic element of this invention, see the aforesaid Draper reissue patent.

In the present invention it is desired to effectively modify the output or indication of the instrument by correcting the error produced by the bank angle of the craft on which it is mounted, that is, by eliminating the cosine function of the bank angle factor. As stated above, this may be done by obtaining a signal which is proportional to a reciprocal function of the cosine of the bank angle, i. e. a secant function, of the bank angle of the craft. It has been found that the resultant acceleration of the component of centripetal acceleration and the component of gravitational acceleration along the normally vertical craft axis is proportional to the secant of the bank angle. The above may be more fully understood by referring to copending application Serial No. 682,602, filed July 10, 1946, now Patent No. 2,553,560, in the name of Orland E. Esval for Aircraft Turn Control. This factor is then interposed between the output shaft of the gyroscopic element and the indicator or output of the instrument and modifies the latter to give an output which is proportional to the true rate of turn of the craft.

Figure 2:
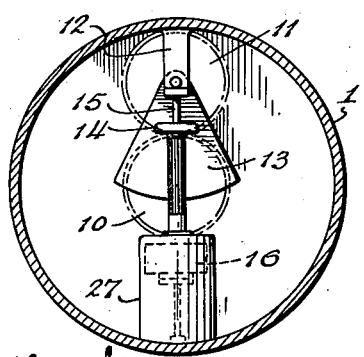
Fig. 2 is a sectional view taken on line 2—2 of Fig. 1.
Figure 3:
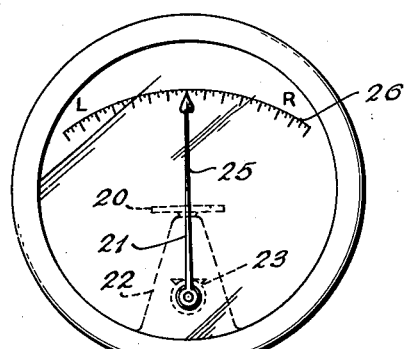
Fig. 3 is a view of the rate gyroscope of Fig. 1 as seen by the pilot.

To accomplish the above result, I have shown a gear 10 mounted on the gimbal trunnion shaft 7 and rotatable therewith. Gear 10 meshes with gear 11 which is journaled in a downwardly projecting bracket 12 at the top of the instrument housing 1. A sector 13 (see Fig. 2) is mounted for rotation with gear 11 and frictionally engages a wheel 14 which is free to rotate and also free to move up and down along a guide rod 15. The guide rod 15 is supported at its top from the bracket 12 and projects downwardly along the vertical axis of the instrument and is supported at its lower end by the housing 1. The wheel 14 is translatable along said guide 15 by the action of a mass 16 which is, in turn, supported by a spring 17 and thrust bearing 18. Between the wheel 14 and the mass 16, an integral therewith is an elongated pinion 19 which engages with a sector gear 20. This sector gear is shown as mounted on a shaft 21, supported for rotation in a bracket 22 which projects upwardly from the base of the instrument housing 1. At the lower end of shaft 21 is a pair of bevelled gears 23 which rotate an output shaft 24 which has fixed thereto at its outer portion an indicating device shown as a pointer 25 and suitably calibrated scale 26 (see Fig. 3).

The mass 16 is shown as being enclosed in a liquid containing case 27, said case forming a damping means for the mass 16 whereby the mass will respond only to long period accelerations and not to short period accelerations such as may be caused by turbulent air. The wheel 14, mass 16, spring 17 and pinion 19 together form a spring suspended, fluid damped accelerometer which is mounted to act along a normal to the floor of the aircraft and to measure the magnitude of the above-mentioned resultant acceleration. The magnitude of the resultant acceleration equals the acceleration of gravity multiplied by the secant of the bank angle, and the instrument correction is effected by the mass and spring combination which is responsive thereto. The mass and spring factors, being constants, may be ascertained by proper instrument design.

In operation, when the airplane banks the rotation of the gyro output shaft 7 is proportional to the rate of turn $\phi$ diminished by cosine $\theta$ (the bank angle). In other words, the rate gyro output on shaft 7 has a rotation which would indicate less than the true rate of turn, but the action of the acceleration sensitive mass 16 pulls down the wheel 14 increasing, through the change of radius between the wheel 14 and the axis of rotation of the friction sector 13, the effective rotation of the output shaft 24. This action, in effect, increases the motion transfer ratio between the gyro output on shaft 7 and the instrument output shaft 24. The amount of displacement of the acceleration sensitive mass 16, measured from the pivot of sector 13, is as above pointed out, made proportional to the secant of the bank angle and therefore the indication provided by pointer 25 and scale 26 is proportional to the product ($\phi$ cosine $\theta$) times (secant $\theta$). Since the secant $\theta$ is equal to $$\frac{1}{\cos \theta}$$

the cosine factor present in the output of the gyro cancels out the cos $\theta$ factor and the modified output appearing at shaft 24 is independent of the bank angle and so is a measure of the true rate of turn of the craft.

Figure 4:
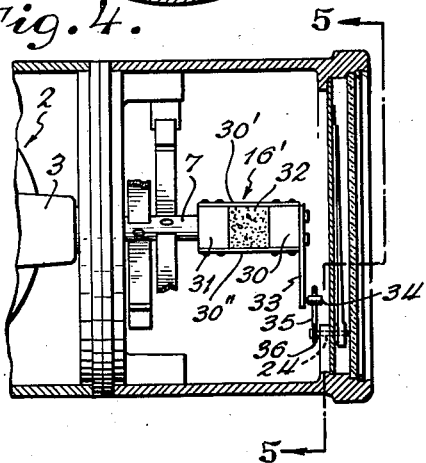
Fig. 4 is a partial section of a rate of turn gyro employing a modification of the invention and in which the gyro structure is not shown.
Figure 5:
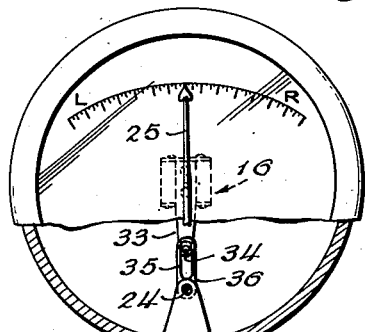
Fig. 5 is a partial section taken along line 5—5 of Fig. 4.

In Fig. 4, there is shown another modification of the invention wherein the acceleration sensitive means 16' is shown as mounted directly on the output shaft 7 of the gyro 2. In this case, the acceleration sensitive element is shown as a mass 30 connected by leaf springs 30', 30'' which are riveted to the mass 30 and the block 31, said block being fastened directly to the gyro output shaft 7. To provide damping of the acceleration sensitive element used in this instance, there is provided between the mass 30 and the block 31 and the leaf springs 30', 30'', a substantially resilient piece of rubber 32.

Attached to the mass 30 is a downwardly projecting arm 33 which has on the end thereof a pin 34 which rides in an elongated slot 35 in a lever arm 36. The mass is permitted to move only along an axis that is substantially parallel to the vertical axis of the craft. The arm 36 is shown as mounted on the output shaft 24 of the instrument. As in the case of Fig. 1, there may be a pointer attached to the end of this shaft readable on a scale similar to that shown in Fig. 3.

In the operation of the modification shown in Fig. 4, when the mass 30 is acted upon by the above-mentioned resultant acceleration force due to banked turning of the craft, it carries downwardly the arm 33 and pin 34, and effectively increases the movement of the pointer 25, which has been displaced by the precession of the gyro, by changing the fulcrum of the lever arm 36.

The modification shown in Fig. 6 is different from that shown in Figs. 1 and 4 in that in this case there is no sliding friction involved. The increased motion transfer ratio between the gyro output shaft 7 and the movement of indicating pointer 25' is accomplished by a series of cross spring hinges of known type.

In this case, the pivot axis 42 of the pointer 25' is defined by pairs of flat cross spring hinges 40 and 40', and 41 and 41'. These springs permit the rotation of the pointer about the axis 42, while at the same time restraining the translation of the pointer. Attached to the output shaft 7 of the rate gyro is an arm 43 which at its upper end has connected a flexible spring 44. Flexible spring 44 is in turn connected to a frame 46 on which are also fastened the cross springs 40, 40' and 41, 41'. These flat springs are fastened to the acceleration sensitive means 16". This means is shown as a mass 47 mounted on the instrument housing 1 by sets of leaf springs 48, 48' and 49, 49' and can be damped by means similar to that shown in Fig. 4. It is obvious from the drawing that the mass 48 is free to move vertically with respect to the craft and yet is restrained by its mounting springs from translational movement parallel to axis 42. A small mass 45 counterbalances the arm 43, pointer 25' and spring 44 together with the frame 46.

In operation when the mass 47 moves down due to accelerations along the vertical axis of the craft during a banked turn it carries with it the cross springs 40, 40', 41, 41', the flat spring 44 and frame 46; therefore, the lever arm between the arm 43 and the axis 42 of the pointer 25' is shortened, thereby increasing the displacement of the pointer 25'. Again, the amount of displacement of the mass 47 is proportional to the secant of the bank angle and, as in the apparatus of Figs. 1 and 4, the output of the instrument is increased as the secant function of the bank angle.

In Fig. 8 there is shown a modification wherein the acceleration sensitive means generates a voltage which is proportional to the secant of the bank angle and this voltage is applied to an electrical pick-off on the rate gyro and modifies the output of this pick-off to give a voltage which is proportional to the azimuthal rate of turn of the craft.

In this case, the acceleration sensitive means 16''' has a mass 51 attached to the housing 1 by means of flat springs 52 and 53 which limit the displacement of the mass 51 along the vertical axis of the craft.

To provide a voltage which is proportional to the secant of the bank angle, there is provided a C-type pick-off whose armature 54 is secured to the mass 51 and movable therewith, and cooperates with the C-shaped core 55 upon each leg of which there are windings 56 and 57. The winding 56 on one of the legs of the pick-off is energized from a source of constant alternating voltage and the winding 57 on the other leg has a voltage induced therein by the relative displacement of the armature 54 between the two legs. The armature is adjusted so that at one-g a certain voltage exists in the winding 57 and any addition to g will produce an increased voltage in winding 57. Since the secant of an angle is never less than unity, the C-pick-off is adjusted to produce an initial voltage output equal to some arbitrary value, say unity, when the acceleration along the vertical craft axis is gravity alone; but the C-pick-off voltage output will increase linearly with displacement of its armature so that the voltage output of the accelerometer will vary with displacement of its armature which is responsive to the resultant acceleration acting on the armature mass which, in turn, is equal to the acceleration of gravity multiplied by the secant of the bank angle.

The output shaft 7 of the gyro 2 controls in this instance an electrical pick-off 59 which gives an output voltage which is proportional to the rate of turn of the craft about the vertical craft axis. The pick-off 59 is in the form of a variable transformer of the E-type which is well known, the center leg having a voltage impressed thereon and the outer legs producing a portion of this voltage reversible in phase and proportional to the relative displacement of the armature of the pick-off. Therefore, shaft 7 carries an arm 60 at the end of which is secured an armature 61. Armature 61 cooperates with the E transformer 62 which is fixed relative to the armature 61.

The output voltage of the C transformer 55 appearing on leads 63 is fed to an amplifier 64 where it is amplified and used to energize the central leg of the E transformer 62. This energizing voltage will vary as the secant of the bank angle and therefore the output of the instrument appearing on leads 65 will be proportional to the rate of turn value measured by the gyro multiplied by the secant of the bank angle.

There is shown in this figure a phase sensitive rectifier 66 into which the voltage appearing on leads 65 is fed for so adjusting the voltage that it may be fed to an indicating mechanism 67, here shown as a meter, which gives a right left indication which is proportional to the rate of turn in azimuth of the craft.

It is to be understood that the voltage appearing on leads 65 may be used to apply a signal proportional to the true rate of turn of the craft to any remote apparatus on the craft, such as an automatic pilot, which requires an alternating current voltage. Of course, the output of the phase sensitive rectifier 66 could be used similarly by an apparatus which requires a D. C. voltage in its operation.

Figure 9:
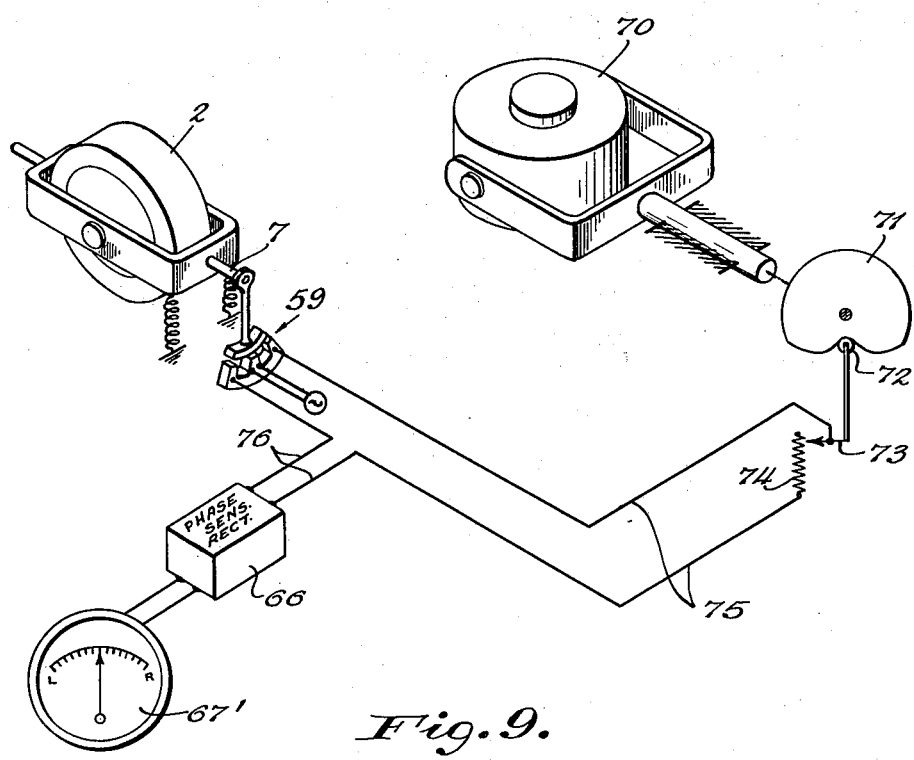
Fig. 9 shows another modification of the invention.

In Fig. 9 there is shown a modification wherein the bank angle of the craft is actually measured by a gyro vertical. A secant function of this measured bank angle is then induced into the output of the rate gyro to modify it and make it proportional to the azimuthal rate of turn.

For this purpose there is shown a gyro vertical 70 which will give a direct measure of the bank angle of the craft. On the roll axis shaft of the gyro vertical 70, there is mounted a cam 71 part of which is cut in the form of a secant curve. Therefore, the cam follower 72 is displaced by cam 71 an amount proportional to the secant of the bank angle. The design of the cam is such that it becomes circular at some angle which is substantially less than 90° because compensation for the error caused by bank angle of the type disclosed in this invention will only be effective up to bank angles of say 60 to 70 degrees.

Cam follower 72 has fixed thereon a slider 73 which cooperates with a potentiometer or rheostat 74. The displacement of the slider 73 causes a resistance drop in the rheostat and therefore an increase in the voltage appearing on the leads 75, this increase being proportional to the secant of the bank angle.

As in Fig. 8, the output shaft 7 of the rate gyro 2 controls the output of an E transformer 59'. However, the central leg thereof is excited by an A. C. voltage from the source 58. The output of the E transformer 59' is connected in series with the rheostat 74 and therefore, the voltage appearing on leads 76 is an A. C. voltage which is proportional to the azimuthal rate of turn of the craft.

As in Fig. 8, there is also shown a phase sensitive rectifier 66 which produces a D. C. signal that is applied to a meter 67' similar to that shown in Fig. 8. Similarly, the voltage appearing at 76 or 66 may be applied directly to an automatic pilot or other apparatus on the craft requiring a voltage which is proportional to the azimuthal rate of turn of the craft.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a true rate of turn indicator having an indication proportional to the rate of turn in azimuth of the craft on which it is mounted, the combination with a rate of turn gyro, of acceleration sensitive means adapted to give a displacement along the vertical craft axis proportional to a function of the angle of tilt of said axis, of an indicator member, of motion transmitting means comprising a flat sector operatively connected with said rate gyro, and a rotatably mounted member in frictional engagement with said sector and radially displaced on said sector member according to the displacement of said acceleration sensitive means, said rotatably mounted member being operatively coupled to said indicator member.

2. In a rate of turn indicator having an indication proportional to the rate of turn in azimuth of the craft on which it is mounted, the combination with a rate of turn gyro, of acceleration sensitive means adapted to give a displacement proportional to the resultant acceleration of said craft along the vertical craft axis and operatively connected with said rate gyro, and of an indicator positioned jointly by said gyro and said acceleration sensitive means whereby said displacement will modify the movement of said indicator to compensate for the error due to a banked attitude of said craft.

3. In a rate of turn instrument having an output signal proportional to the rate of turn in azimuth of the craft on which it is mounted undiminished as a function of the bank angle of said craft, the combination with a rate of turn gyro, of means responsive to the resultant acceleration of said craft along the vertical craft axis for producing a signal proportional to said resultant acceleration, and means controlled by said signal producing means for compensating for the effect of attitude of the craft in bank on the rate of turn output signal of said rate of turn gyro.

4. A rate of turn instrument having an indication proportional to the rate of turn in azimuth of the craft on which it is mounted, comprising a rate of turn gyro, an indicator operated thereby, an acceleration sensitive means responsive to the resultant acceleration of said craft along the vertical craft axis and adapted to have a displacement along said axis proportional to a function of the bank angle of said craft, a motion transmitting means for operatively connecting said rate gyro and said indicator, and means controlled by said acceleration means for varying the motion transfer ratio of said transmitting means.

5. In a rate of turn instrument adapted to give an output signal proportional to the rate of turn in azimuth of the craft on which it is mounted, the combination with a rate of turn gyro having an output signal, a source of voltage, an acceleration sensitive member sensitive to the resultant acceleration of said craft along the vertical craft axis, of means connected with said voltage source and operated by said acceleration sensitive member for supplying a voltage output dependent in magnitude on said resultant acceleration, and means for combining said voltage output with said gyro output signal, whereby to vary said gyro output signal in accordance with said resultant acceleration.

6. In a rate of turn instrument adapted to give an output signal proportional to the azimuthal rate of turn of the craft on which it is mounted, the combination with a rate of turn gyro, of a source of voltage, of a first variable transformer responsive to movement of said gyro, of an acceleration sensitive means sensitive to the resultant acceleration of said craft along the vertical craft axis and adapted to have a displacement proportional to said resultant acceleration, of a second variable transformer connected to said voltage source and operated by said acceleration sensitive means for producing an output proportional to said displacement, said second transformer output being connected to said first transformer whereby the voltage output of said second transformer controls the voltage output of said first transformer.

7. A rate of turn indicator having an output proportional to the rate of turn in azimuth of the craft on which it is mounted and comprising a rate of turn gyro providing a measure of rate of turn uncorrected for the bank angle of said craft, a rate of turn indicator, means for connecting said rate gyro to operate said indicator, an acceleration sensitive means responsive to the resultant acceleration of said craft along the vertical craft axis for providing an output dependent upon bank angle of the craft, and means connecting the output of said acceleration sensitive means with said indicator-connecting means for effecting an operation of said indicator in accordance with the output of said rate gyro modified by a function of craft bank angle.

8. In an instrument of the character described for dirigible craft, the combination with means for measuring the rate of turn of the craft about the vertical axis thereof, an indicator, means for connecting the output of said rate measuring means to operate said indicator, an acceleration sensitive means responsive to the resultant acceleration of said craft along the vertical craft axis for providing an output dependent upon bank angle of the craft, and means connecting the output of said acceleration sensitive means with said indicator-connecting means for effecting an operation of said indicator in accordance with the output of said rate gyro modified by a function of craft bank angle.

9. In an instrument of the character described for dirigible craft, the combination with means for measuring the rate of turn of the craft about the vertical axis thereof, an indicator, means for connecting the output of said rate measuring means to operate said indicator, an acceleration sensitive means responsive to the resultant acceleration of said craft along the vertical craft axis for providing an output dependent upon bank angle of the craft, and means connecting the output of said acceleration sensitive means with said indicator-connecting means for effecting an operation of said indicator in accordance with the output of said rate gyro modified by a secant function of craft bank angle.

WALTER WRIGLEY.

REFERENCES CITED

The following references are of record in the file of this patent:

UNITED STATES PATENTS

| Number | Name | Date |
|---|---|---|
| Re. 22,330 | Draper | June 8, 1943 |
| 1,924,037 | Henderson | Aug. 22, 1933 |

FOREIGN PATENTS

| Number | Country | Date |
|---|---|---|
| 329,122 | Italy | Sept. 2, 1935 |